July 16, 1935.  O. D. McFARLAND  2,008,029
PLANETARY CUTTING MACHINE
Filed Dec. 29, 1934   3 Sheets-Sheet 1
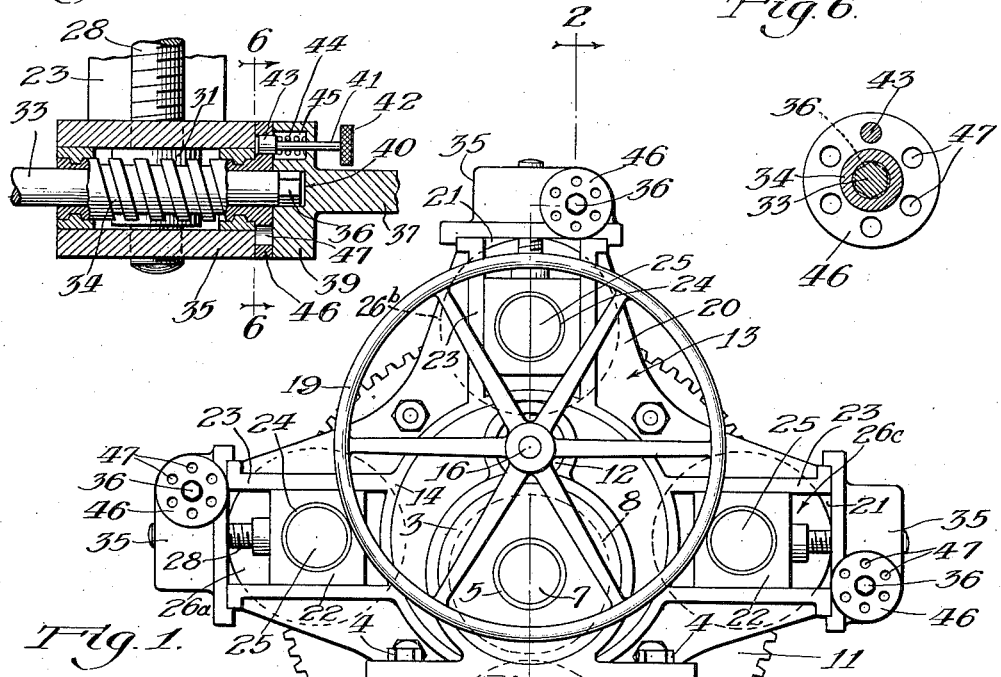
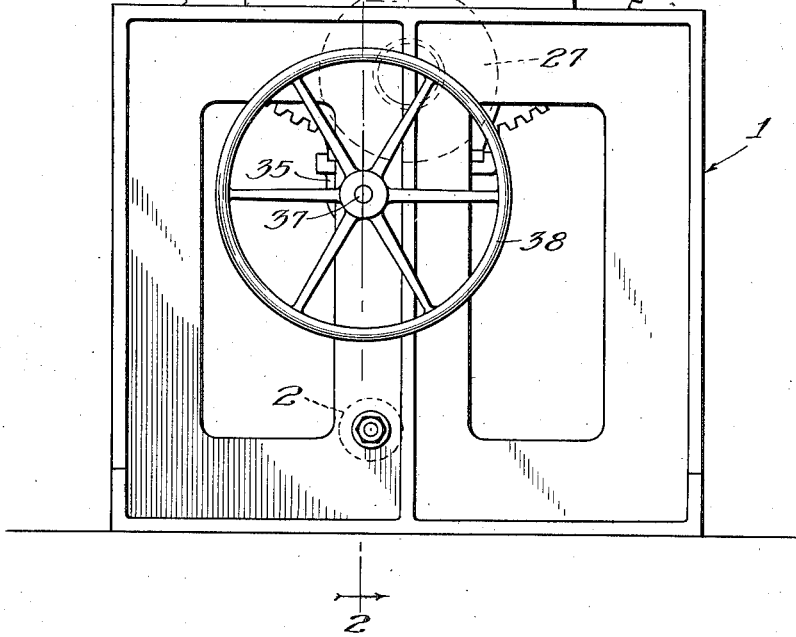
Inventor:
Owen D. McFarland,
By Lee J. Gary
Attorney

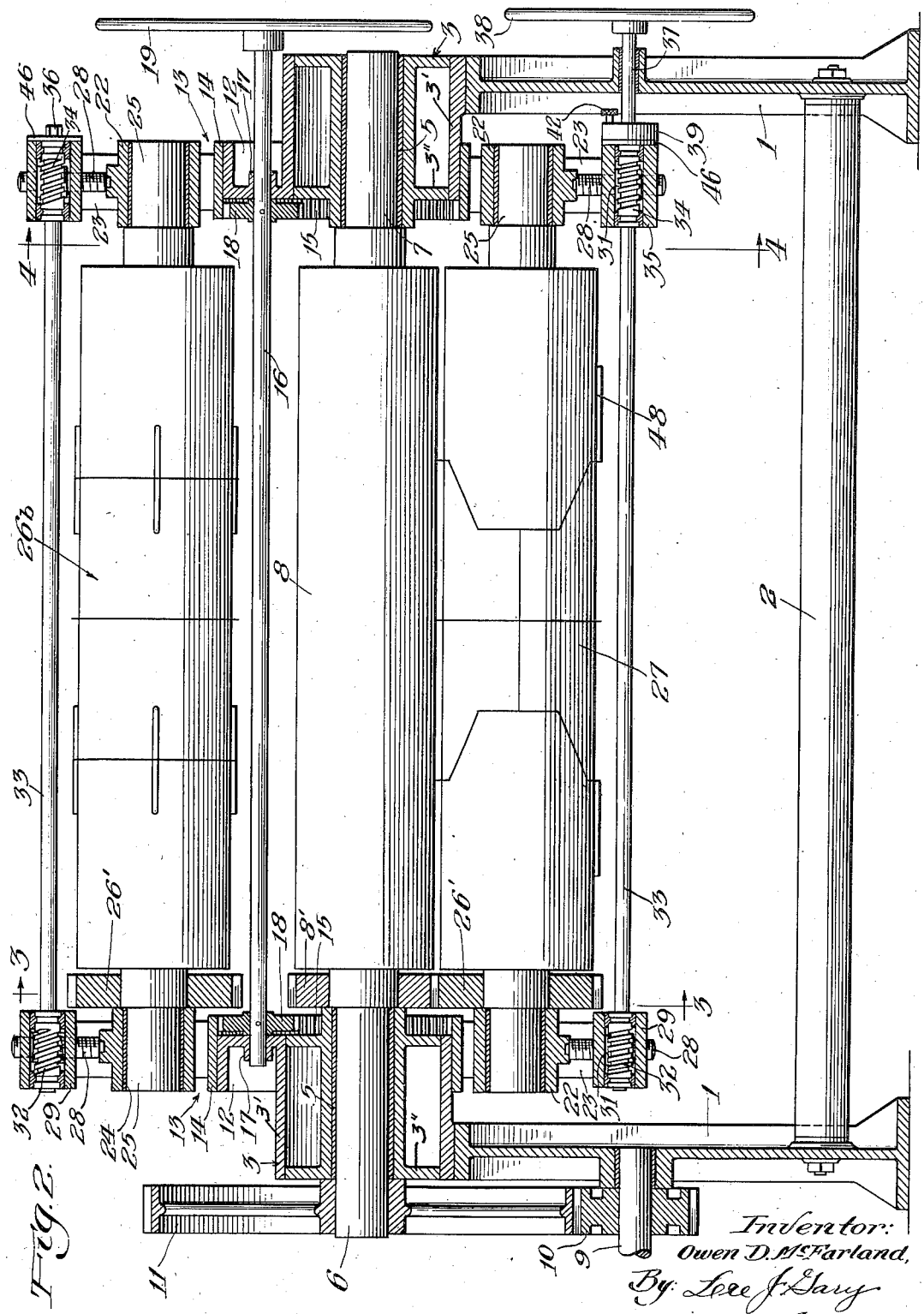

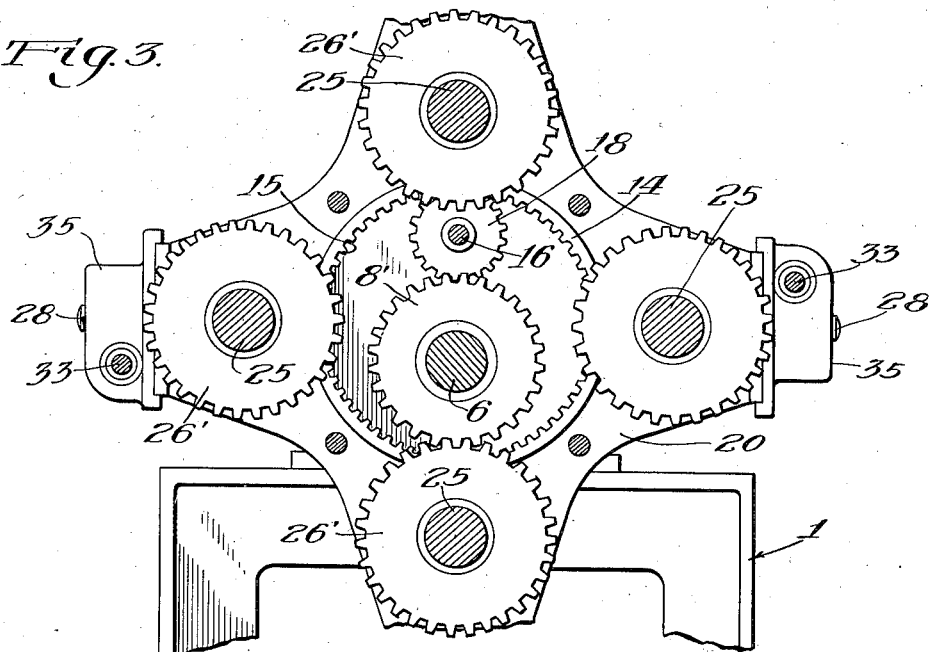
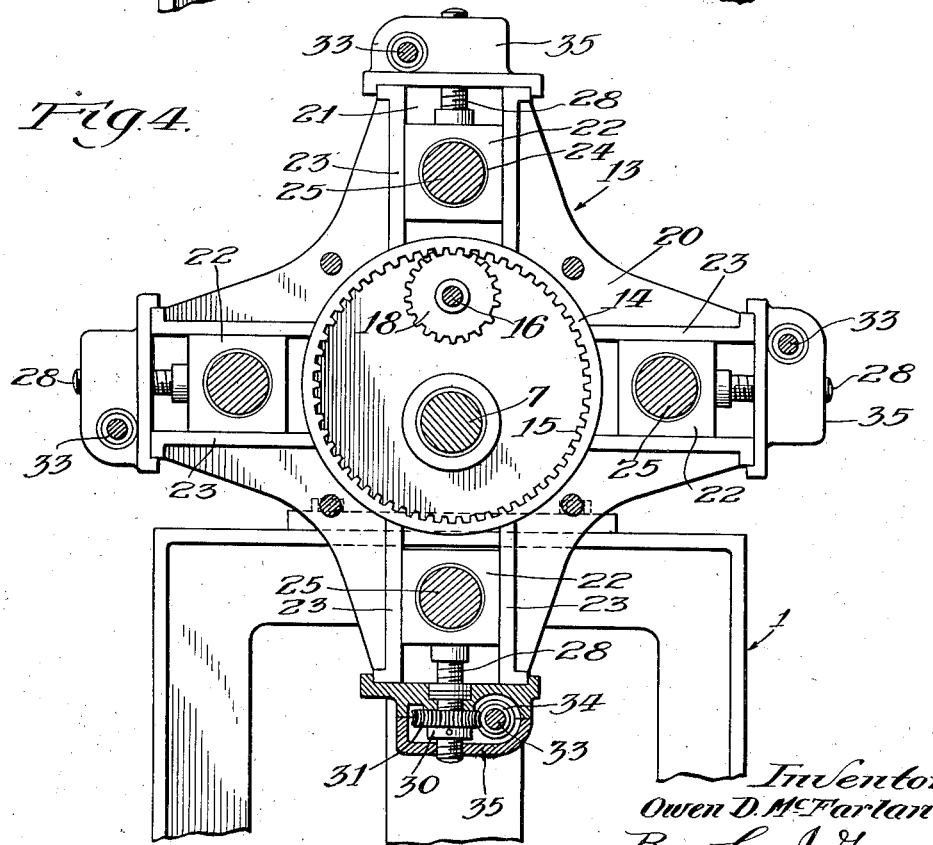

Patented July 16, 1935

2,008,029

UNITED STATES PATENT OFFICE 2,008,029

PLANETARY CUTTING MACHINE

Owen D. McFarland, Chicago, Ill., assignor to Roofing Machinery Mfg. Co., Chicago, Ill., a corporation of Illinois Application December 29, 1934, Serial No. 759,703

10 Claims. (Cl. 164—60)

This invention relates to improvements in rotary cutting machines and refers specifically to a machine for cutting a continuously traveling web, the machine being characterized in that a plurality of different cutting rolls may be carried thereby, each of which may be pre-adjusted to cutting position whereby said rolls may be selectively moved in planetary fashion into or out of cutting position and, when so disposed, will be immediately ready for the cutting operation.

The objects and advantages of my invention will be apparent from the accompanying drawings and following detail description.

In the drawings, Fig. 1 is an end elevational view of a machine embodying the concepts of my invention.

Fig. 2 is a sectional view taken on line 2—2 of Fig. 1.

Fig. 3 is a sectional view taken on line 3—3 of Fig. 2.

Fig. 4 is a sectional view taken on line 4—4 of Fig. 2.

Fig. 5 is a detail sectional view of one of the worm adjusting screws.

Fig. 6 is a sectional view taken on line 6—6 of Fig. 5.

Referring in detail to the drawings, 1—1 indicates a pair of frames or supports which may be rigidly secured together by means of tie rod or spacer 2, said frames being adapted to support the moving portions of my machine. A bearing 3 may be mounted upon each of the frames 1 and may be secured thereto by means of bolts 4 or the like. The bearings 3 may be lined with bearing metal 5 such as babbitt or the like, and said bearings are adapted to receive the restricted ends 6 and 7 of bed roll 8. A shaft 9 may be journalled in one of the frames 1 and may carry a pinion 10. A spur gear 11 may be secured to the end of the shaft 6 and meshes with pinion 10. In operation shaft 9 may be driven by a suitable source of power (not shown) and by means of the gears 10 and 11 bed roll 8 may thereby be rotated.

Bearings 3 may be constructed in separable portions and comprises a fixed portion 3' and a removable portion 3'' which may be fastened together with bolts or the like (not shown). The arrangement is such that roll 8 together with the movable portion 3'' of bearings 3 may be removed longitudinally from the machine without disturbing other portions of the device merely by disengaging the removable portion 3'' of bearing 3, for instance, at the left side of the device and shifting roll 8 to the left through the fixed portion 3' of the bearing 3.

Cylindrical drums 12 may be carried by bearings 3 and may be formed integral with said bearings, said drums being eccentrically disposed with respect to the axis of bed roll 8. A frame or spider 13 may be rotatably mounted upon each of the drums 12, each of said frames having a central circular opening defined by a ring 14. Rings 14 are adapted to be positioned over drums 12, the outer surfaces of said drums and the inner surfaces of said rings being in contact whereby bearings for said frames are provided. A portion of the inner surfaces of rings 14 are provided with gear teeth 15 whereby a ring gear is formed. A shaft 16 may be journalled adjacent each of its ends in bearings 17 provided in the faces of drums 12 and pinions 18 may be rigidly mounted upon shaft 16 in such position as to register with or engage the teeth of the ring gears 15. A hand wheel 19 may be mounted upon one end of shaft 16 whereby said shaft may be rotated.

In operation, when hand wheel 19 is turned and shaft 16 thereby rotated, pinions 18 meshing with gears 15 cause frames 13 to rotate about drums 12. It can readily be seen that, inasmuch as drums 12 are eccentric with respect to the axis of shaft 8, frames 13 will rotate about shaft 8 in an orbital or planetary manner. Each of the frames 13 comprise web members 20, a plurality of which may be secured to rings 14. Between adjacent web members a space 21 is provided wherein bearing blocks 22 may be slidably positioned, said blocks being adapted to slide between guides 23 formed integral with the adjacent webs 20.

In the embodiment of my invention herein shown and described, four such web members are shown and, consequently, provision is made in each frame 13 to carry four bearing blocks 22. However, it is to be understood that my invention is not to be limited to this precise construction inasmuch as broadly the invention contemplates the provision of two or more units which are to be supported by the bearing blocks.

Each of the bearing blocks 22 may be provided with a central aperture which may be lined with a suitable bearing metal 24 and corresponding bearings carried by each frame are adapted to support the restricted ends or shaft portions 25 of cutting cylinders 26a, 26b, 26c and 27.

In devices of this class, utilized for cutting continuously traveling flexible webs, for instance, cutting strip shingles or the like, a bed roll is provided which, acting in conjunction with a suitable cutting cylinder, operates to properly sever the passing web, said web being adapted to travel between the bed roll and the cutting cylinder. In my invention one of a plurality of cutting cylinders is adapted to be disposed in cutting position, namely, the cutting cylinder in lowermost position. Referring particularly to Fig. 2, it will be seen that the cutting cylinder 27 is shown in cutting position, said cylinder being disposed adjacent bed roll 8. When one of the cutting cylinders is disposed in cutting position the remaining cutting cylinders, due to the eccentric relationship of rings 14 and bed roll 8, are spaced from said bed roll.

A screw 28 may be secured to each bearing block 22 and may project outwardly from said block in a line parallel to guides 23, each of said screws projecting through housings 29 which may be mounted upon the ends of guides 23. A collar 30 may be rigidly secured to each of the screws 28 within the housings 29 and is adapted to retain a worm wheel 31 in desired position upon each of the screws, the worm wheel being threadedly engaged with the threads of the screw. A worm pinion 32 may be positioned within each of the housings 29, said pinion being adapted to engage with the threads of the worm wheel 31. It can readily be seen that when the pinion 32 is rotated, worm wheel 31 will also be rotated and, inasmuch as said latter worm wheel is threadedly associated with screw 28, rotary movement of the wheel 31 will impart movement of translation to the screw 28, said screw being maintained stationary with respect to bearing block 22.

It is to be understood, of course, that a worm gear mechanism, as has been hereinbefore described, is associated with each of the blocks 22 on both sides of the machine. Consequently, the disposition of the various cutting rolls with respect to the bed roll 8 may be changed by rotating the corresponding worm pinions 32.

A shaft 33 may span the machine between opposite housings 29. At one end of each of the shafts the pinion 32 may be rigidly mounted. However, at the opposite ends of each of the shafts a pinion 34 may be loosely mounted within housings 35. Each of the shafts 33 project outwardly from housings 35 and may be squared or otherwise angularly formed at its ends as shown best at 36 in Fig. 5. A shaft 37 may be journalled in one of the frames 1 and may be provided with a hand wheel 38 at one end thereof. The opposite end of said shaft may carry a circular plate 39 which may be provided with a central recess 40 which conforms in contour with the end 36 of shaft 33. A pin 41 may project through the plate 39 and may carry a knob 42 at one end thereof. The opposite end may terminate in a button 43 and a coil spring 44 may encircle pin 41 within recess 45 provided in plate 39 whereby pin 41 is normally projected in the direction of the button-end of said pin. A plate 46 may be rigidly secured to pinion 34 and may be provided with a plurality of circumferentially spaced apertures 47.

In operation the desired cutting cylinders may be mounted in the bearing blocks 22 and prior to setting the machine into operation, each of the cutting cyliners is rotated to cutting position. When the cutting cylinder is rotated to cutting position as shown at 27 in Fig. 2, housing 35 will be positioned opposite plate 39 and shaft 33 will be brought into alignment with shaft 37. When in this position the end 36 of shaft 33 engages in aperture 40 in plate 39 and, consequently, shaft 33 may be rotated by properly manipulating hand wheel 38. However, in order to move each opposite bearing block simultaneously, plate 39 must be so positioned with respect to plate 46 that button 43 engages with one of the apertures 47. When this engagement is accomplished, pinion 34 will be rotated by movement of shaft 37 and inasmuch as pinion 32 is rigidly secured to shaft 33, both pinions 34 and 32 will be rotated simultaneously and, consequently, the worm wheels 31 associated with each of the pinions will be simultaneously rotated thereby imparting equal movement to each of the screws 28. In this manner the knives 48 of the cylinder 27, that is, the cylinder in cutting position may be disposed a desired distance away from the surface of bed roll 8. In the event that one or the other end of the cylinder 27 is to be raised or lowered with respect to the opposite end, pin 41 may be retracted by manipulation of knob 42 so as to disengage button 43 from aperture 47. When this disengagement is accomplished and hand wheel 38 is rotated, motion of rotation will be imparted only to pinion 32 and, consequently, only that block at the far side of the machine will be moved upwardly or downwardly. Each of the shafts 25 carrying rolls 26a, 26b, 26c or 27 may also carry spur gears 26'. When any of the rolls are in the position of roll 27, the corresponding spur gear 26' of said roll meshes with spur gear 8' associated with roll 8 and is driven thereby.

The machine comprising by present invention finds its use particularly in conjunction with the manufacture of roofing material. As is well known to the art, shingles or shingle strips cut from continuously passing webs are manufactured in a continuous operation which comprises saturating the web in an asphalt bath prior to passage of the same to the cutting machine. Consequently, it is desirable that when an operation is once commenced that it be continued without material interruption. In the usual cutting machines, if shingles of a predetermined pattern are being cut and it is desired that another pattern be cut after a predetermined number of the first pattern have been supplied, it has been necessary to stop the operation of the machine and go through the time consuming and laborious task of changing cutting cylinders so that the new type shingle may be cut. In so stopping the operation, obviously the saturating operation must also be stopped and complications and difficulties necessarily are met with in stopping the saturating operation.

In my present invention a plurality of cutting cylinders may be mounted upon the machine, said cylinders being arranged in orbital or planetary fashion around the bed roll 8. Prior to commencing operations, each cylinder may be brought to cutting position, that is, the position in which cylinder 27 is shown and when each of said cylinders is in this position the knives thereof may be adjusted with respect to the bed roll 8 by the means hereinbefore described. After adjustment of each of the cylinders the same may be rotated out of cutting position by manipulating hand wheel 19 and thereby revolving the cutting cylinders in a planetary manner.

It can readily be seen that when all of the cylinders have been properly adjusted to cutting position one of the said cylinders may be maintained in said position and the web threaded between the bed roll and said cylinder. When a desired number of shingles have been cut utilizing this cutting cylinder and it is desired to cut shingles of a different pattern, the web may be severed and hand wheel 19 again manipulated to bring the desired cutting cylinder into cutting position. The severed web may then be threaded between the new cutting cylinder and the bed roll 8 and operations may then be continued.

Although my invention is particularly applicable to the cutting of roofing shingles or the like, it can also be utilized wherever co-acting rolls are used, for instance, rolls 26a, 26b, 26c or 27 instead of being cutting cylinders may be the form rolls of a printing or embossing press or, if desired, the rolls may be so constructed as to act upon a plastic sheet which may be adapted to pass between the co-acting rolls. The broad concept of my invention resides in a mechanism wherein a plurality of acting rolls are adapted to be selectively brought into cooperative position with a single bed or anvil roll.

I claim as my invention:

1. A machine for cutting continuously advancing web-like material which comprises in combination, a rotating bed roll, a plurality of cutting cylinders disposed in orbital relationship around said bed roll, and means for moving one of said cylinders into cutting position with respect to said bed roll.

2. A machine for cutting continuously advancing web-like material which comprises in combination, a rotating bed roll, a plurality of cutting cylinders disposed in orbital relationship around said bed roll, and means for moving said cylinders in a planetary path around said bed roll.

3. A machine for cutting continuously advancing web-like material which comprises in combination, a rotating bed roll, bearings for said bed roll, a frame positioned upon opposite bearings and rotatable about said bearings in an eccentric path around said bed roll, a plurality of cutting cylinders carried between said frames, said cylinders being circumferentially spaced from each other, and means for rotating said frames to successively bring said cylinders into osculating position with respect to said bed roll.

4. A machine for cutting continuously advancing web-like material which comprises in combination, a rotating bed roll, bearings for said bed roll, a frame positioned upon opposite bearings and rotatable about said bearings in an eccentric path around said bed roll, a plurality of cutting cylinders carried between said frames, said cylinders being circumferentially spaced from each other, means for rotating said frames to successively bring said cylinders into osculating position with respect to said bed roll, and means for moving the cylinder in osculating position laterally with respect to said bed roll while maintaining the remaining cylinder stationary.

5. A machine for cutting continuously advancing web-like material which comprises in combination, a rotating bed roll, bearings for said bed roll, a frame positioned upon opposite bearings and rotatable about said bearings in an eccentric path around said bed roll, a plurality of cutting cylinders carried between said frames, said cylinders being circumferentially spaced from each other, means for rotating said frames to successively bring said cylinders into osculating position with respect to said bed roll, and means for moving one end of the cylinder in osculating position laterally with respect to said bed roll and independent of the opposite end of said cylinder.

6. A machine for cutting continuously advancing web-like material which comprises in combination, a rotating bed roll, bearings for said bed roll, a drum carried by each bearing, said drum being eccentrically positioned upon said bearing, a frame rotatably positioned upon each of said drums, bearings carried by each frame, a cutting cylinder journalled in each opposite pair of said frame bearings, and means for rotating said frames to successively move each cutting cylinder to osculating position with respect to said bed roll.

7. A machine for cutting continuously advancing web-like material which comprises in combination, a rotating bed roll, bearings for said bed roll, a drum carried by each bearing, said drum being eccentrically positioned upon said bearing, a frame rotatably positioned upon each of said drums, bearings carried by each frame, a cutting cylinder journalled in each opposite pair of said frame bearings, means for rotating said frames to successively move each cutting cylinder to osculating position with respect to said bed roll, and means for laterally moving each cylinder with respect to said bed roll.

8. A machine for cutting continuously advancing web-like material which comprises in combination, a rotating bed roll, bearings for said bed roll, a drum eccentrically positioned upon each of said bearings, said bed roll and bearings being removable as a unit from said drums, a frame rotatably positioned upon each of said drums, bearings carried by each frame, a cutting cylinder journalled in each opposite pair of said frame bearings, and means for rotating said frame to successively move each cutting cylinder to osculating position with respect to said bed roll.

9. A machine for cutting continuously advancing web-like material which comprises in combination, a frame, a bearing removably mounted at each end of the frame, a bed roll journalled in said bearings, said bed roll being removable axially with said bearings from said frame, a series of cutting rolls rotatably mounted upon said frame, the axes of said cutting rolls being rotatable with respect to said bed roll whereby one of said rolls may be removed to a position adjacent said bed roll.

10. A machine for cutting continuously advancing web-like material which comprises in combination, a frame, a bearing removably mounted at each end of the frame, a bed roll journalled in said bearings, said bed roll being removable axially with said bearings from said frame, a spider rotatably mounted on each side of said frame, a plurality of cutting rolls carried by said spiders, said cutting rolls being circumferentially spaced from each other, and means for moving a predetermined cutting roll into osculating position with respect to said bed roll.

OWEN D. McFARLAND.